US010852745B2

(12) United States Patent
Jeon et al.

(10) Patent No.: US 10,852,745 B2
(45) Date of Patent: Dec. 1, 2020

(54) AUTONOMOUS DRIVING ROBOT APPARATUS AND METHOD FOR AUTONOMOUSLY DRIVING THE ROBOT APPARATUS

(71) Applicant: ELECTRONICS AND TELECOMMUNICATIONS RESEARCH INSTITUTE, Daejeon (KR)

(72) Inventors: Seo-Hyun Jeon, Daejeon (KR); Myung-Chan Roh, Daejeon (KR); Seung-Hwan Park, Daejeon (KR); Yu-Cheol Lee, Daejeon (KR); Jae-Yeon Lee, Daejeon (KR); Jae-Hong Kim, Daejeon (KR); Young-Jo Cho, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 389 days.

(21) Appl. No.: 15/942,721

(22) Filed: Apr. 2, 2018

(65) Prior Publication Data
US 2019/0018427 A1    Jan. 17, 2019

(30) Foreign Application Priority Data

Jul. 17, 2017   (KR) .................. 10-2017-0090421

(51) Int. Cl.
*G05D 1/02*   (2020.01)
*G05D 1/00*   (2006.01)

(52) U.S. Cl.
CPC ......... *G05D 1/0289* (2013.01); *G05D 1/0011* (2013.01); *G05D 1/0088* (2013.01);
(Continued)

(58) Field of Classification Search
CPC .. G05D 1/0289; G05D 1/0011; G05D 1/0274; G05D 1/0214; G05D 1/0088; G05D 2201/0216; Y10S 901/01
See application file for complete search history.

(56) References Cited

U.S. PATENT DOCUMENTS

| 8,234,032 B2 | 7/2012 | Lee et al. |
| 9,144,904 B2 * | 9/2015 | McGee ................. B25J 9/1666 |

(Continued)

FOREIGN PATENT DOCUMENTS

| JP | 2016-055963 | 4/2016 |
| KR | 10-2009-0057867 | 6/2009 |

(Continued)

OTHER PUBLICATIONS

Michal Cap et al., "Provably Safe and Deadlock-Free Execution of Multi-Robot Plans under Delaying Disturbances," 2016 IEEE/RSJ International Conference on Intelligent Robots and Systems (IROS); arXiv:1603.08582v1 [cs.RO] Mar. 28, 2016.

*Primary Examiner* — Thomas Ingram
(74) *Attorney, Agent, or Firm* — Kile Park Reed & Houtteman PLLC

(57) ABSTRACT

Disclosed herein are an autonomous driving robot apparatus and an autonomous driving method. The autonomous driving method of the autonomous driving robot apparatus includes receiving task information for autonomous driving from a server device for supporting autonomous driving; creating a route for autonomous driving based on the task information and performing autonomous driving; and selecting an autonomous driving operation corresponding to any one of moving, waiting, and wandering when arriving at a preset destination by performing autonomous driving along the route.

19 Claims, 13 Drawing Sheets

(52) U.S. Cl.
CPC ......... *G05D 1/0214* (2013.01); *G05D 1/0274* (2013.01); *G05D 2201/0216* (2013.01); *Y10S 901/01* (2013.01)

(56) References Cited

U.S. PATENT DOCUMENTS

| | | |
|---|---|---|
| 9,400,187 B2 | 7/2016 | Lee |
| 2012/0165984 A1 | 6/2012 | Kang et al. |
| 2017/0123423 A1* | 5/2017 | Sako .................. G06Q 30/0645 |
| 2017/0277191 A1* | 9/2017 | Fairfield .............. G05D 1/0088 |

FOREIGN PATENT DOCUMENTS

| | | |
|---|---|---|
| KR | 10-2013-0044859 | 5/2013 |
| KR | 10-1286815 | 7/2013 |
| KR | 10-1575231 | 12/2015 |
| KR | 10-2017-0049349 | 5/2017 |
| KR | 10-1737792 | 5/2017 |

\* cited by examiner

AUTONOMOUS DRIVING ROBOT APPARATUS AND METHOD FOR AUTONOMOUSLY DRIVING THE ROBOT APPARATUS

CROSS REFERENCE TO RELATED APPLICATION

This application claims the benefit of Korean Patent Application No. 10-2017-0090421, filed Jul. 17, 2017, which is hereby incorporated by reference in its entirety into this application.

BACKGROUND OF THE INVENTION

1. Technical Field

The present invention relates generally to technology for controlling a robot, and more particularly to technology for controlling multiple autonomous driving robots.

2. Description of the Related Art

With the development of autonomous driving techniques of robots, autonomous driving robots are increasingly used for physical distribution. An Autonomous Guided Vehicle (AGV) is an existing autonomous driving technique using a robot, which is configured such that a robot moves along a guided line. Currently, the Kiva system and Swisslog's Transcar make use of AVG for material transport activities in factories and hospitals.

AGV is configured such that a robot precisely moves along a fixed route, with a server monitoring every movement of the robot in real time. Accordingly, a route is planned and managed in advance in order to prevent robots from colliding and to prevent the routes of robots from overlapping.

The document of a related art, entitled "Provably safe and deadlock-free execution of multi-robot plans under delaying disturbance", discloses a method for creating a route in advance in order to avoid the collision of robots by adjusting the travel time or the speed of the robots.

However, because AGV is configured such that a robot moves along a guided line made of a magnetic tape or a tape with a marker, it is disadvantageous in that the guided line must be constructed in advance in order to operate robots.

Also, in the case of an AVG, because a robot cannot move when it deviates from the guided line, it is difficult to operate the robot in a space in which people are moving. Furthermore, because a network connection between a server and a robot may be lost in a wide area, such as a hospital, an airport, or the like, monitoring and driving control of the robot may not be performed normally.

Meanwhile, an autonomous driving robot is advantageous in that it may be immediately applied in existing buildings without the need to construct a guided line and in that the robot may autonomously drive while avoiding obstacles even in the space in which people are moving around. Accordingly, autonomous driving robots have recently proliferated widely.

Here, in order to improve delivery efficiency, a plurality of autonomous driving robots may be used in the same room. However, when multiple robots encounter each other in a small space, a deadlock may occur. Fundamentally, when it encounters a moving obstacle, the autonomous driving robot waits until the obstacle passes by. When it encounters a fixed obstacle, the autonomous driving robot creates a new route to avoid the obstacle and moves along the new route if the space around the obstacle is sufficiently wide.

However, when robots encounter each other in a small space, the robots cannot create a detour route, but can only stand still. Because most robots do not have a precise sensor at the back, it is difficult not only to create a route for reversing itself but also to select which robot to reverse.

Also, because a robot cannot recognize another robot unless it is equipped with an additional device, when two robots meet face to face, the robots cannot escape from the situation without assistance.

Also, when robots have the same destination, if one robot arrives at and occupies the destination, the following robot erroneously determines that an obstacle is present at the destination, thus the following robot may not arrive at the destination.

Here, the following robot continually attempts to enter the destination by creating a detour route for avoiding the obstacle, but cannot reach the destination. That is, a robot remains stationary in the state in which the robot cannot recognize the other robot, and cannot escape from the deadlock because it cannot perform a subsequent task.

Also, autonomous driving robots may come to a deadlock when using a shared resource corresponding to a space that is shared among robots and people, for example, a narrow passage, an automatic door, an elevator, or the like.

Particularly, when autonomous driving robots that are using a shared resource come to a deadlock, the robots cannot break the deadlock by themselves, and people who want to use the shared resource may be inconvenienced. Therefore, it is necessary to prevent such a deadlock.

Meanwhile, Korean Patent Application Publication No. 10-2017-0049349, entitled "Obstacle detection apparatus for autonomous driving robot and autonomous driving system having the same", relates to an apparatus for detecting an obstacle and an autonomous driving robot having the apparatus, and discloses an apparatus for detecting an obstacle for a fast-moving autonomous driving robot and an autonomous robot having the apparatus.

However, Korean Patent Application Publication No. 10-2017-0049349 does not mention a method for resolving a deadlock caused when multiple autonomous driving robots and people encounter each other in a small space.

SUMMARY OF THE INVENTION

An object of the present invention is to resolve a deadlock caused in a small space in which it is difficult for multiple autonomous driving robots to simultaneously drive in opposite directions.

Another object of the present invention is to prevent an autonomous driving robot from coming to a deadlock that is caused in a shared resource, the use of which is simultaneously requested by multiple autonomous driving robots.

A further object of the present invention is to improve the delivery efficiency of autonomous driving robots and to reduce the expense of driving the autonomous driving robots.

In order to accomplish the above objects, an autonomous driving method of an autonomous driving robot apparatus according to an embodiment of the present invention includes receiving task information for autonomous driving from a server device for supporting autonomous driving; creating a route for autonomous driving based on the task information and performing autonomous driving; and selecting an autonomous driving operation corresponding to any one of moving, waiting, and wandering when arriving at a preset destination by performing autonomous driving along the route.

Here, selecting the autonomous driving operation may be configured to determine at least one of a kind and a state of the destination and to select the autonomous driving operation depending on the determination.

Here, selecting the autonomous driving operation may be configured such that the autonomous driving robot apparatus checks whether there is available space in a waiting area when the kind of the destination is determined to be an entrance to the waiting area.

Here, selecting the autonomous driving operation may be configured such that the autonomous driving robot apparatus moves to an exit of the waiting area when it is determined that there is available space in the waiting area.

Here, selecting the autonomous driving operation may be configured such that, when an obstacle is sensed en route to the exit of the waiting area, the autonomous driving robot apparatus waits at a current position while maintaining a preset distance from the obstacle.

Here, selecting the autonomous driving operation may be configured such that the autonomous driving robot apparatus moves in order to maintain the preset distance when the obstacle moves away from the autonomous driving robot apparatus.

Here, selecting the autonomous driving operation may be configured such that the server device for supporting autonomous driving checks whether a shared resource is occupied when the autonomous driving robot apparatus arrives at the exit of the waiting area.

Here, selecting the autonomous driving operation may be configured such that the server device for supporting autonomous driving sequentially puts information about an autonomous driving robot apparatus that made a request for use of the shared resource in a resource request queue and manages the resource request queue.

Here, selecting the autonomous driving operation may be configured such that the server device for supporting autonomous driving sequentially approves the requests of the autonomous driving robot apparatuses for the use of the shared resource in an order in which pieces of information of the autonomous driving robot apparatuses are put in the resource request queue when the server device for supporting autonomous driving receives a message for announcing completion of the use of the shared resource.

Here, selecting the autonomous driving operation may be configured such that the server device for supporting autonomous driving compares priorities of delivery tasks assigned to the autonomous driving robot apparatuses, the information of which is put in the resource request queue, and sequentially approves the requests of the autonomous driving robot apparatuses for the use of the shared resource depending on the priorities.

Here, selecting the autonomous driving operation may be configured such that the server device for supporting autonomous driving checks specifications of the autonomous driving robot apparatuses, information of which is put in the resource request queue, determines whether the shared resource is capable of being simultaneously used by at least two autonomous driving robot apparatuses, and approves the requests of the at least two autonomous driving robot apparatuses for the use the shared resource.

Here, selecting the autonomous driving operation may be configured such that the autonomous driving robot apparatus moves to a preset wandering area and wanders in the wandering area when it is determined that there is no available space in the waiting area.

Here, selecting the autonomous driving operation may be configured such that the autonomous driving robot apparatus wanders in the wandering area and checks whether there is available space in the waiting area at preset intervals using sensor data or by moving to the entrance of the waiting area.

Here, selecting the autonomous driving operation may be configured such that the autonomous driving robot apparatus checks a priority of a delivery task and moves to the entrance of the waiting area at intervals that are set so as to correspond to the priority, thereby checking whether there is available space in the waiting area.

Also, in order to accomplish the above objects, an autonomous driving robot apparatus according to an embodiment of the present invention includes a robot network communication unit for receiving task information from a server device for supporting autonomous driving; a robot state management unit for creating a route for autonomous driving based on the task information; a driving unit for performing autonomous driving along the route; and a driving condition determination unit for selecting an autonomous driving operation corresponding to any one of moving, waiting, and wandering when arriving at a preset destination by performing autonomous driving along the route and for controlling the driving unit depending on the autonomous driving operation.

Here, the driving condition determination unit may select the autonomous driving operation by determining at least one of a kind and a state of the destination.

Here, the driving condition determination unit may check whether there is available space in a waiting area when the kind of the destination is determined to be an entrance to the waiting area, and may select an autonomous driving operation corresponding to any one of moving and wandering depending on whether there is available space in the waiting area.

Here, when an obstacle is sensed en route to an exit of the waiting area, the driving condition determination unit may make the autonomous driving robot apparatus wait at a current position while maintaining a preset distance between the autonomous driving robot apparatus and the obstacle.

Here, when arrival at the entrance of the waiting area is detected, the driving condition determination unit may make a request to the server device for supporting autonomous driving for use of a shared resource, and the server device for supporting autonomous driving may sequentially put information about an autonomous driving robot apparatus that made the request for the use of the shared resource in a resource request queen and manage the resource request queue.

Here, when it is determined that there is no available space in the waiting area, the driving condition determination unit may move the autonomous driving robot apparatus to a preset wandering area, make the autonomous driving robot apparatus wander therein, and move the autonomous driving robot apparatus to the entrance of the waiting area at preset intervals, thereby checking whether there is available space in the waiting area.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
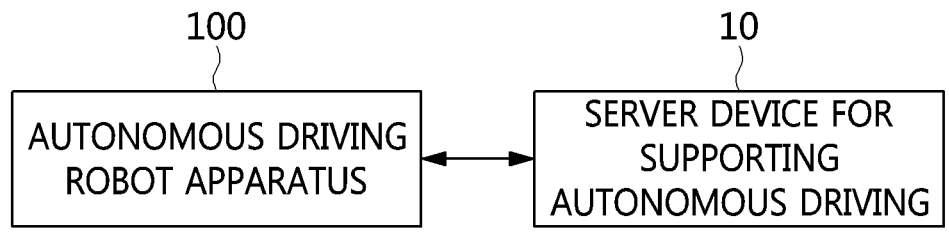
FIG. 1 is a block diagram that shows an autonomous driving system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

FIG. 1 is a block diagram that shows an autonomous driving system according to an embodiment of the present invention.

Referring to FIG. 1, the autonomous driving system according to an embodiment of the present invention may be configured such that an autonomous driving robot apparatus 100 may perform autonomous driving by sharing various kinds of information with a server device 10 for supporting autonomous driving through network communication.

Here, the autonomous driving robot apparatus 100 may minimize communication with the server device 10 for supporting autonomous driving after it receives space information and route information for autonomous driving therefrom.

Also, the autonomous driving robot apparatus 100 may use a shared resource under the control of the server device 10 for supporting autonomous driving.

Figure 2:
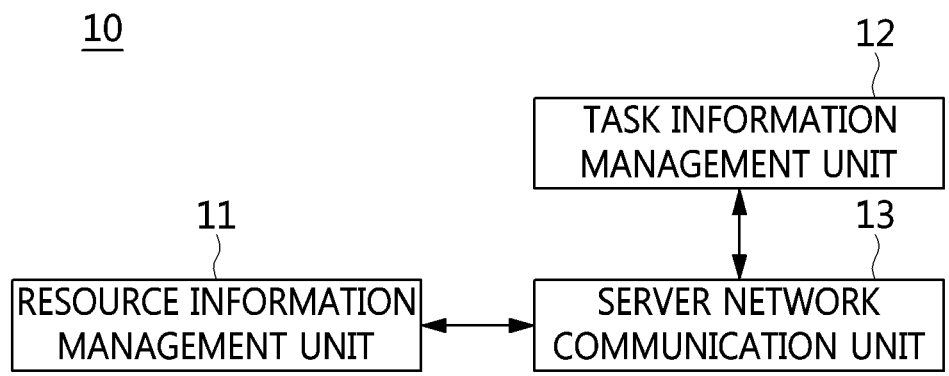
FIG. 2 is a block diagram that shows a server device for supporting autonomous driving according to an embodiment of the present invention.

FIG. 2 is a block diagram that shows a server device for supporting autonomous driving according to an embodiment of the present invention.

Referring to FIG. 2, the server device 10 for supporting autonomous driving according to an embodiment of the present invention includes a resource information management unit 11, a task information management unit 12, and a server network communication unit 13.

The resource information management unit 11 may manage the delivery task of an autonomous driving robot apparatus 100, and may provide the autonomous driving robot apparatus 100 with information about the occupancy and use of a shared resource associated with the delivery task and information about whether there is available space in a waiting area.

Here, using map data, the resource information management unit 11 may set areas corresponding to shared resources on the map data.

Here, the resource information management unit 11 may receive map data, on which items designated as shared resources are marked, from a user via a GUI.

Here, the resource information management unit 11 may check items designated as shared resources on the received map data.

The items designated as shared resources may be various kinds of space, areas and resources in which the autonomous driving robot apparatus 100 may come to a deadlock, for example, an elevator, an automatic door, a narrow passage, and the like.

Also, the resource information management unit 11 may receive map data on which a waiting area and a wandering area are specified from a user.

For example, the waiting area may be set in such a way that a user designates an area on a map by clicking the area with a mouse or in such a way that coordinates are directly input from a robot.

The waiting area may be an area in which an autonomous driving robot apparatus 100 waits in order to use a shared resource in the order of arrival when the shared resource is being used.

Here, the autonomous driving robot apparatus 100 may wait in line for a shared resource in order to use the shared resource together with people.

The wandering area may be a wide area in which the autonomous driving robot apparatus 100 may wait while wandering when there is no available space in the waiting area.

Here, a specific area may be designated as the wandering area, and the wandering area may be a circular region having a preset radius based on preset coordinates.

Here, the resource information management unit 11 sets an entrance and an exit for a waiting area and designates the space therebetween as the waiting area.

Here, the resource information management unit 11 may set a distance between autonomous driving robot apparatuses 100 in the waiting area.

Also, the resource information management unit 11 may store information about whether there is available space in the waiting area.

Also, for the autonomous driving robot apparatuses 100 waiting in the waiting area, the resource information management unit 11 may store a list of requests for using a shared resource and information about whether the shared resource is occupied, and may approve the use of the shared resource.

Here, the resource information management unit 11 may put information about the autonomous driving robot apparatus 100 that made the request for the use of a shared resource in a resource request queue, and may update information about whether the shared resource is occupied when the autonomous driving robot apparatus 100 uses the shared resource.

Here, the resource information management unit 11 may give approval for the use of the shared resource to an autonomous driving robot apparatus 100 in the order in which information about the autonomous driving robot apparatuses is put in the resource request queue.

Here, the resource information management unit 11 may preferentially give approval for the use of a shared resource to an autonomous driving robot apparatus 100 to which a high-priority delivery task is assigned.

Here, the resource information management unit 11 may check whether the shared resource may be simultaneously used by two or more autonomous driving robot apparatuses 100 using the specifications thereof (i.e., the size, the weight, and the like).

Here, when it is determined that at least two autonomous driving robot apparatuses 100 can simultaneously use the shared resource, the resource information management unit 11 may preferentially give approval of the use of the shared resource to the at least two autonomous driving robot apparatuses 100.

Here, the resource information management unit 11 may store a list of autonomous driving robot apparatuses 100 instructed to wait in the waiting area in a waiting area queue, and may update information about whether there is available space in the waiting area.

The task information management unit 12 may create information about a task to be assigned to an autonomous driving robot apparatus 100.

Here, the task information management unit 12 may create task information based on the information set by the resource information management unit 11.

The task information may include a Point Of Interest (POI), such as a start point, a destination, a stop, or the like of an autonomous driving robot apparatus 100, a delivery command, priority information, and information associated with a product to be delivered.

Here, the task information may include a delivery command for delivering a product depending on Points Of Interest.

For example, four coordinate values, A, B, C and D, may be set as POI.

Here, the delivery command may be a command for directing delivery to be performed in the order of A, B, C and D.

Here, A may be a place in which a product is to be loaded, D may be a place in which the product is to be unloaded, and B and C may be a waiting area and a wandering area in front of a shared resource.

Also, stops may be a waiting area and a wandering area, and the coordinate information of the stops may include the coordinates of the entrance to the waiting area, the coordinates of the exit from the waiting area, and the coordinates of the wandering area.

The server network communication unit 13 may provide task information by performing network communication with the autonomous driving robot apparatus 100.

Figure 3:
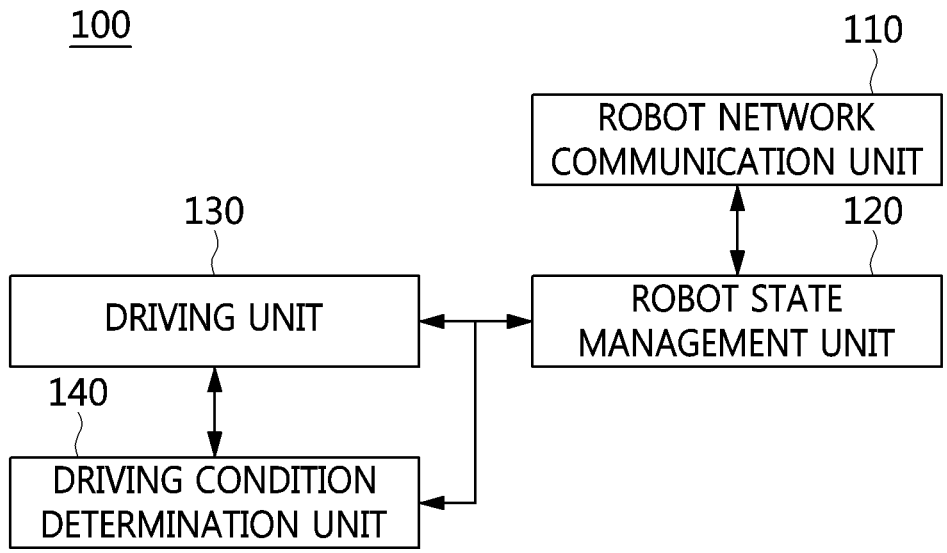
FIG. 3 is a block diagram that shows an autonomous driving robot apparatus according to an embodiment of the present invention.

FIG. 3 is a block diagram that shows an autonomous driving robot apparatus according to an embodiment of the present invention.

Referring to FIG. 3, the autonomous driving robot apparatus 100 according to an embodiment of the present invention includes a robot network communication unit 110, a robot state management unit 120, a driving unit 130, and a driving condition determination unit 140.

The robot network communication unit 110 may perform network communication with a server device 10 for supporting autonomous driving.

Here, the robot network communication unit 110 may receive task information about a delivery task from the server device 10 for supporting autonomous driving.

Also, the robot network communication unit 110 may request the server device 10 for supporting autonomous driving to check whether a shared resource is occupied and to approve the use of the shared resource.

Here, the robot network communication unit 110 may receive a control command for using the shared resource from the server device 10 for supporting autonomous driving.

The robot state management unit 120 may create a route to a destination using the task information received from the server device 10 for supporting autonomous driving.

Here, the robot state management unit 120 may store the task information, and may create a route from a POI to another POI.

For example, a destination may be a POI designated as the next place based on the current coordinates.

If a delivery command is set to 'A→B→C→D', when the autonomous driving robot apparatus 100 arrives at point B after starting from point A, the robot state management unit 120 may set point C as a destination and create a route from point B to point C.

Also, the robot state management unit 120 may perform a delivery task using the received task information, and may manage the status of the delivery task.

The driving unit 130 may perform autonomous driving of the autonomous driving robot apparatus 100 along the route to the destination.

Here, the driving unit 130 may control the movement and stoppage of the autonomous driving robot apparatus 100 depending on autonomous driving commands given by the driving condition determination unit 140.

Here, the driving condition determination unit 140 may acquire environment information from sensor data, which are collected using sensors.

Here, the driving condition determination unit 140 may return the coordinate values of the current position acquired by extracting characteristics from the environment information.

For example, the driving condition determination unit 140 may return the current position acquired from sensor data as the coordinate values <x, y, theta, floor>.

Here, until the autonomous driving robot apparatus 100 arrives at the destination, the driving condition determination unit 140 may perform autonomous driving of the autonomous driving robot apparatus 100 while checking a route from the coordinates of the current position to the destination.

Also, the driving condition determination unit 140 may detect whether an obstacle is present using sensor data.

Here, the driving condition determination unit 140 may create a detour route from the current position to the coordinates of the destination in order to avoid the obstacle.

Here, when the obstacle on the route is a fixed obstacle, the driving condition determination unit 140 creates a detour route and drives the autonomous driving robot apparatus 100 along the detour route.

Here, when the obstacle on the route is a moving obstacle, the driving condition determination unit 140 may make the autonomous driving robot 100 stand still at the current position until the moving obstacle passes by.

Here, when the moving obstacle deviates from the route, the driving condition determination unit 140 may drive the autonomous driving robot apparatus 100 along the route.

Also, when the autonomous driving robot apparatus 100 arrives at the destination, the driving condition determination unit 140 may make a network connection with the server device 10 for supporting autonomous driving and send a state message for announcing the arrival thereto.

Here, when the destination corresponds to the coordinates of the entrance to the waiting area, the driving condition determination unit 140 may check whether there is available space in the waiting area using a sensor or by receiving information thereabout from the server device 10 for supporting autonomous driving.

Here, when the autonomous driving robot apparatus 100 arrives at the entrance to the waiting area, the driving condition determination unit 140 may make a request to the server device 10 for supporting autonomous driving for the use of a shared resource.

Here, when the autonomous driving robot apparatus 100 enters the waiting area via the entrance thereof, if there is space ahead, the driving condition determination unit 140 may perform autonomous driving of the autonomous driving robot apparatus 100 towards the coordinates of the exit of the waiting area along the route.

Here, when an obstacle ahead is sensed while moving in the waiting area, the driving condition determination unit 140 may make the autonomous driving robot apparatus 100 wait at the current position while maintaining a preset distance from the obstacle.

Here, when the obstacle ahead moves away, the driving condition determination unit 140 may drive the autonomous driving robot apparatus 100 towards the coordinates of the exit of the waiting area in order to maintain the preset distance from the obstacle.

Also, when there is no available space in the waiting area, the driving condition determination unit 140 may move the autonomous driving robot apparatus 100 to the wandering area.

Here, the driving condition determination unit 140 may make the autonomous driving robot apparatus 100 wander in the wandering area until a sufficient amount of space is available in the waiting area.

Here, the driving condition determination unit 140 interrupts wandering of the autonomous driving robot apparatus 100 at preset intervals and moves the autonomous driving robot apparatus 100 to the coordinates of the entrance of the waiting area, thereby checking whether there is available space in the waiting area.

Here, when it is determined that there is available space in the waiting area, the driving condition determination unit 140 may drive the autonomous driving robot apparatus 100 to the coordinates of the exit of the waiting area along the route.

Also, when it is determined that the autonomous driving robot apparatus 100 arrives at the coordinates of the exit of the waiting area, the driving condition determination unit 140 may receive information about whether a shared resource is occupied from the server device 10 for supporting autonomous driving.

Here, the driving condition determination unit 140 may request information about whether a shared resource is occupied from the server device 10 for supporting autonomous driving.

Here, if the shared resource is occupied, the driving condition determination unit 140 may make the autonomous driving robot apparatus 100 wait in the waiting area, but if not, the driving condition determination unit 140 receives approval for the use of the shared resource from the server device 10 for supporting autonomous driving and uses the shared resource.

Here, the driving condition determination unit 140 may receive a control command for the use of the shared resource from the server device 10 for supporting autonomous driving and deliver the control command to the driving unit 130, whereby the server device 10 supporting autonomous driving may control the use of the shared resource by the autonomous driving robot apparatus 100.

Then, the driving condition determination unit 140 may create a route to a destination and drive the autonomous driving robot apparatus 100 until the autonomous driving robot apparatus 100 arrives at the destination.

Figure 4:
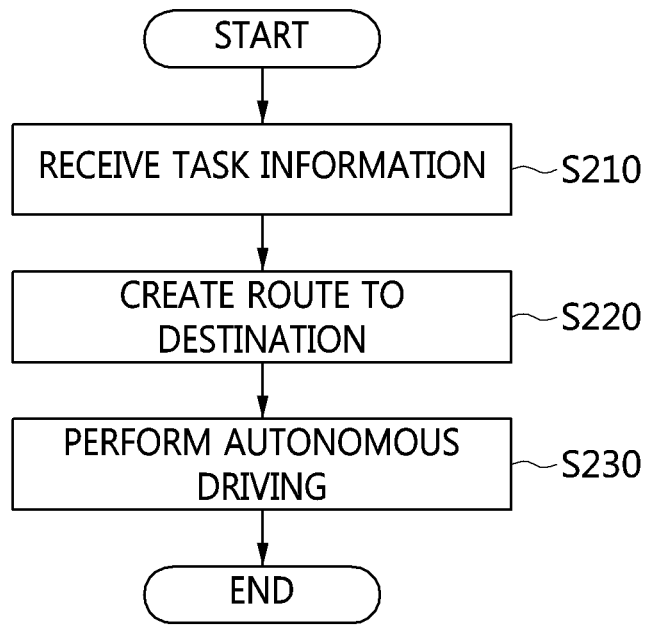
FIG. 4 is a flowchart that shows an autonomous driving method according to an embodiment of the present invention.
Figure 5:
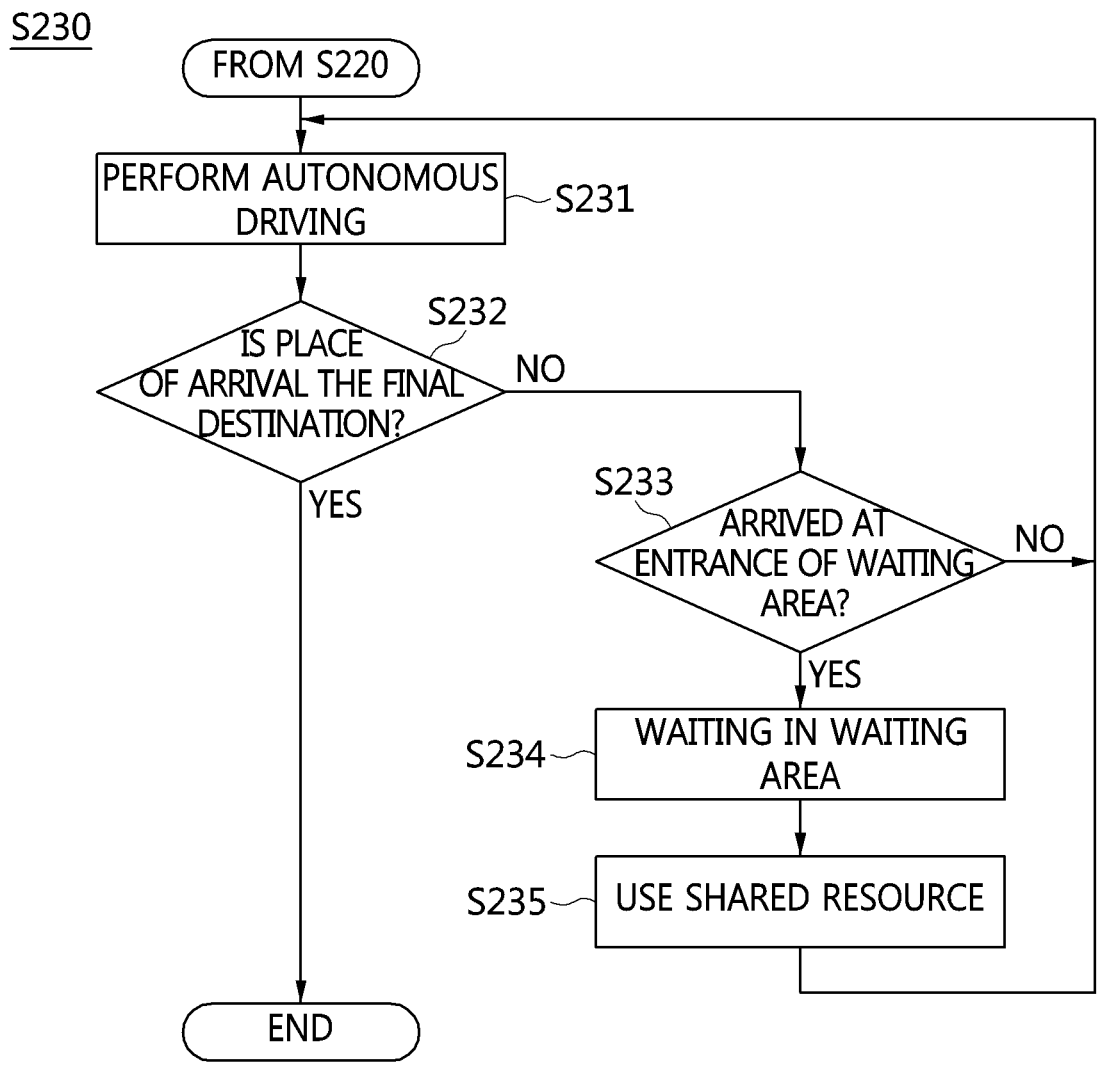
FIG. 5 is a flowchart that specifically shows an example of the step of performing autonomous driving, illustrated in FIG. 4.
Figure 6:
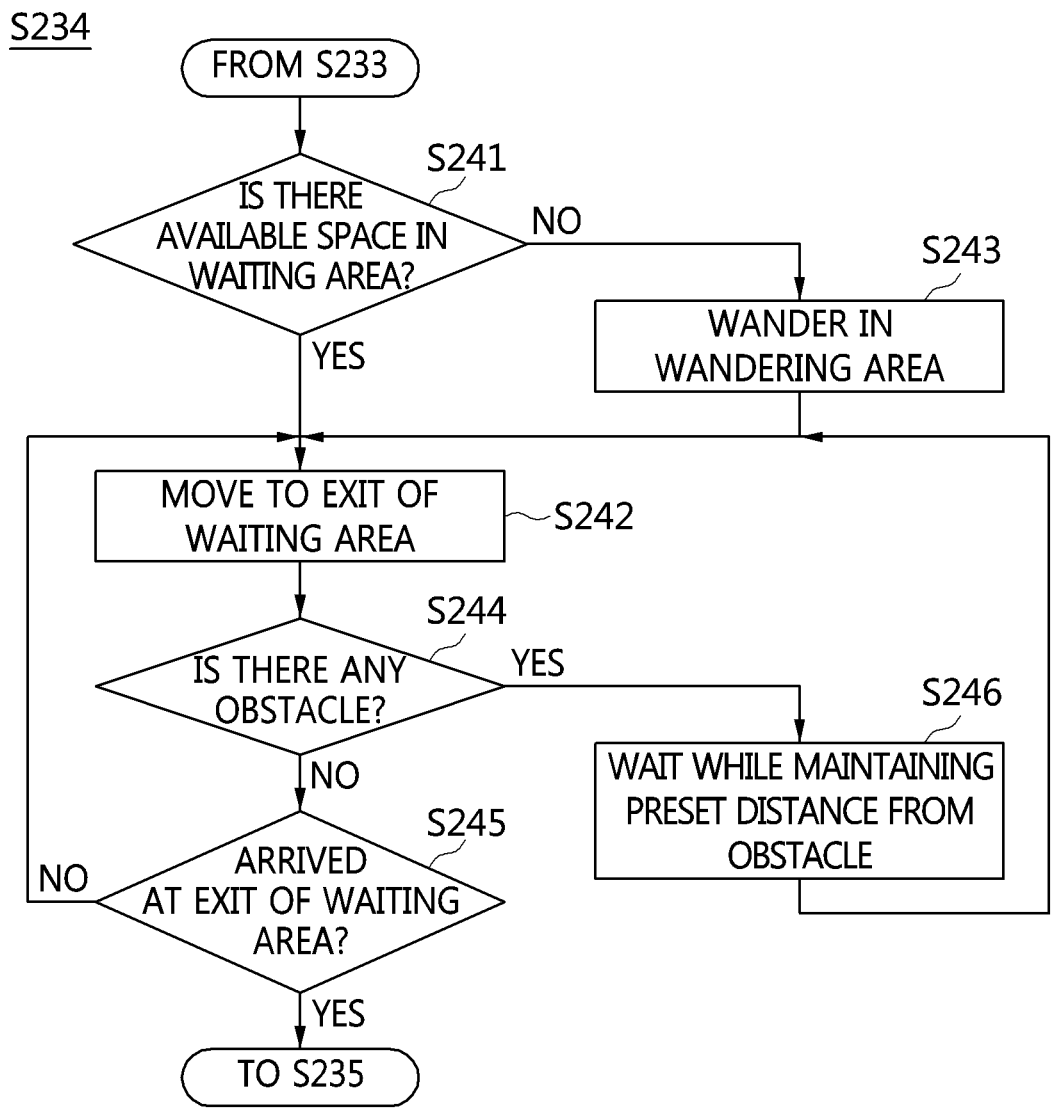
FIG. 6 is a flowchart that specifically shows an example of the step of waiting in a waiting area, illustrated in FIG. 5.
Figure 7:
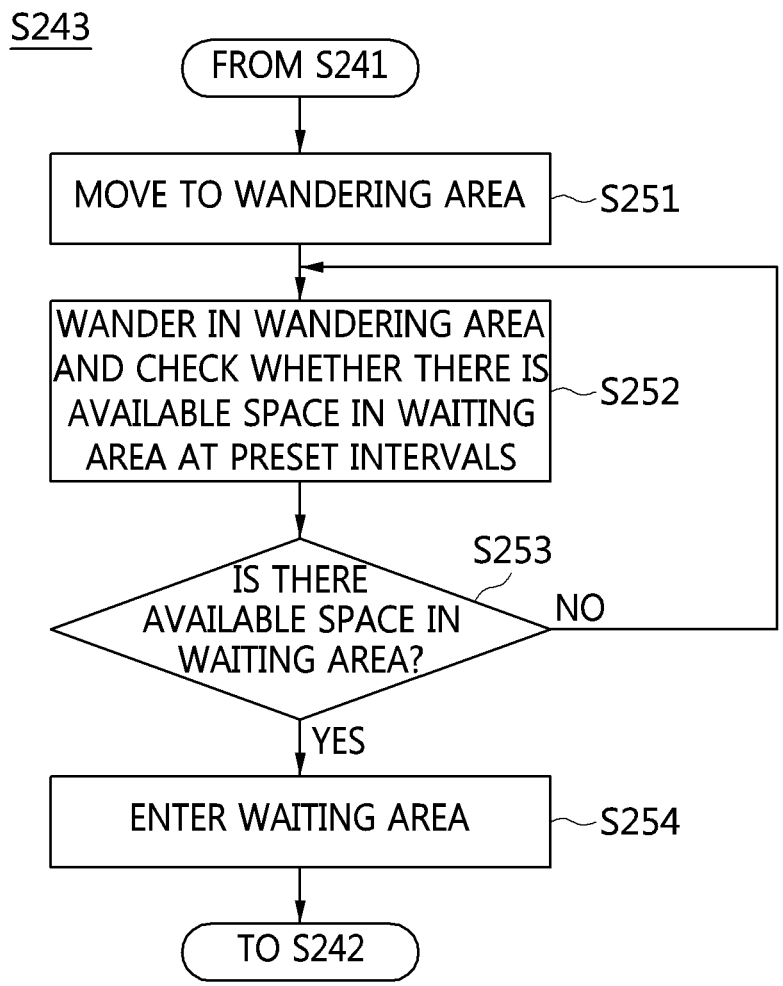
FIG. 7 is a flowchart that specifically shows an example of the step of waiting in a wandering area, illustrated in FIG. 6.
Figure 8:
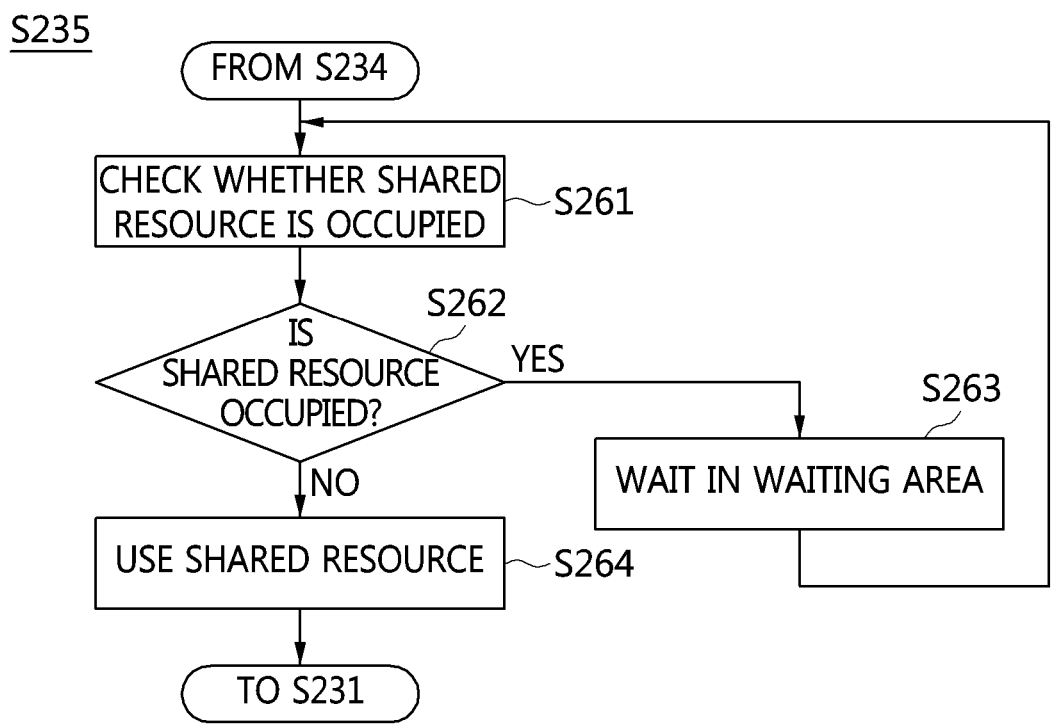
FIG. 8 is a flowchart that specifically shows an example of the step of using a shared resource, illustrated in FIG. 5.

FIG. 4 is a flowchart that shows an autonomous driving method according to an embodiment of the present invention. FIG. 5 is a flowchart that specifically shows an example of the step of performing autonomous driving, illustrated in FIG. 4. FIG. 6 is a flowchart that specifically shows an example of the step of waiting in a waiting area, illustrated in FIG. 5. FIG. 7 is a flowchart that specifically shows an example of the step of waiting in a wandering area, illustrated in FIG. 6. FIG. 8 is a flowchart that specifically shows an example of the step of using a shared resource, illustrated in FIG. 5.

Referring to FIG. 4, in the autonomous driving method according to an embodiment of the present invention, first, task information may be received at step S210.

That is, at step S210, an autonomous driving robot apparatus 100 may receive task information from a server device 10 for supporting autonomous driving and configure settings for autonomous driving.

Also, in the autonomous driving method according to an embodiment of the present invention, a route to a destination may be created at step S220.

That is, at step S220, a route to a destination may be created for each Point Of Interest (POI) based on the task information received by the autonomous driving robot apparatus 100.

Also, in the autonomous driving method according to an embodiment of the present invention, autonomous driving may be performed at step S230.

Referring to FIG. 5, at step S230, the autonomous driving robot apparatus 100 may perform autonomous driving along the created route at step S231.

Here, at step S231, when it drives along the route, the autonomous driving robot apparatus 100 may sense an obstacle on the route.

Here, at step S231, when the sensed obstacle is a fixed obstacle, the autonomous driving robot apparatus 100 may create a detour route for returning to the original route after maneuvering around the fixed obstacle.

Here, at step S231, the autonomous driving robot apparatus 100 may avoid the fixed obstacle by moving along the created detour route.

Also, at step S231, when the sensed obstacle is a moving obstacle, the autonomous driving robot apparatus 100 may wait until the moving obstacle deviates from the route.

Here, at step S231, when the moving obstacle deviates from the route, the autonomous driving robot apparatus 100 may resume autonomous driving.

Here, at step S231, the autonomous driving robot apparatus 100 may perform autonomous driving to the set destination along the route.

Also, at step S230, whether the place of arrival is the final destination may be checked at step S232.

That is, at step S232, when it is determined that the place at which the autonomous driving robot apparatus 100 has arrived is the final destination, at which autonomous driving is to be terminated, autonomous driving may be terminated and a delivery task may be performed.

Here, at step S232, when it is determined that the place at which the autonomous driving robot apparatus 100 has arrived is not the final destination, whether the place of arrival is a waiting area for a shared resource may be checked at step S233.

Here, at step S233, when it is determined that the place of arrival matches the coordinates of the entrance to a waiting area, the autonomous driving robot apparatus 100 may wait in the waiting area at step S234 in order to use a shared resource, but when it is determined that the place of arrival does not match the coordinates of the entrance to the waiting area, the autonomous driving robot apparatus 100 may determine that the current position is the wrong destination and perform autonomous driving along the route at step S231.

Here, at step S233, the autonomous driving robot apparatus 100 may additionally check whether the place at which the autonomous driving robot apparatus 100 has arrived is a waiting area by requesting information thereabout from the server device 10 for supporting autonomous driving.

Here, at step S233, when it is determined that the autonomous driving robot apparatus 100 has arrived at the coordinates of the entrance to the waiting area, the autonomous driving robot apparatus 100 may make a request to the server device 10 for supporting autonomous driving for the use of a shared resource.

Here, at step S233, the server device 10 for supporting autonomous driving may put information about the autonomous driving robot apparatus 100, which has made a request for the use of the shared resource, in a resource request queue.

Also, at step S230, the autonomous driving robot apparatus 100 may wait in the waiting area at step S234.

Referring to FIG. 6, at step S234, whether there is available space in the waiting area may be checked at step S241.

That is, at step S241, the autonomous driving robot apparatus 100 may check whether there is available space in the waiting area using sensor data or by requesting information thereabout from the server device 10 for supporting autonomous driving. When it is determined that there is available space in the waiting area, the autonomous driving robot apparatus 100 may perform autonomous driving towards the coordinates of the exit of the waiting area at step S242, but when it is determined that there is no available space in the waiting area, the autonomous driving robot apparatus 100 may move to a wandering area and wait therein at step S243.

That is, at step S242, the autonomous driving robot apparatus 100 may perform autonomous driving towards the coordinates of the exit of the waiting area.

Referring to FIG. 7, at step S243, the autonomous driving robot apparatus 100 may move to the wandering area at step S251.

Also, at step S243, the autonomous driving robot apparatus 100 may wait in the wandering area, and may check whether there is available space in the waiting area at preset intervals at step S252.

That is, at step S252, the autonomous driving robot apparatus 100 wanders in the wandering area and moves to the coordinates of the entrance of the waiting area at preset intervals in order to check whether there is available space in the waiting area using sensor data or by requesting information thereabout from the server device 10 for supporting autonomous driving.

Here, at step S252, the higher the priority of the delivery task assigned to the autonomous driving robot apparatus 100, the shorter the interval for checking whether there is available space in the waiting area.

Also, at step S243, when it is determined that there is available space in the waiting area, the autonomous driving robot apparatus 100 may enter the waiting area at step S254, but when it is determined that there is no available space in the waiting area, the autonomous driving robot apparatus 100 may wait in the wandering area while wandering at step S252.

Referring again to FIG. 6, at step S234, the autonomous driving robot apparatus 100 may detect that an obstacle is present at step S244.

That is, at step S244, when it senses an obstacle on the way to the exit of the waiting area, the autonomous driving robot apparatus 100 may wait at its current position while maintaining a preset distance from the obstacle at step S246. When no obstacle is sensed, the autonomous driving robot apparatus 100 may perform autonomous driving and check whether it arrives at the coordinates of the exit of the waiting area at step S245.

That is, at step S246, the autonomous driving robot apparatus 100 waits at the current position while maintaining the preset distance from the obstacle, and when the obstacle is not sensed because it has moved, the autonomous driving robot apparatus 100 may again move towards the coordinates of the exit of the waiting area at step S242 in order to maintain the preset distance.

Here, at step S245, when it arrives at the coordinates of the exit of the waiting area, the autonomous driving robot apparatus 100 may use the shared resource at step S235. However, if it has not yet arrived at the coordinates of the exit of the waiting area, the autonomous driving robot apparatus 100 may perform autonomous driving towards the coordinates of the exit of the waiting area at step S242.

Also, at step S230, a shared resource may be used at step S235.

Referring to FIG. 8, at step S235, whether the shared resource is occupied may be checked at step S261.

That is, at step S261, when the autonomous driving robot apparatus 100 arrives at the coordinates of the exit of the waiting area, the server device 10 for supporting autonomous driving may check whether the shared resource is occupied.

Here, at step S261, the autonomous driving robot apparatus 100 may request information about whether the shared resource is occupied from the server device 10 for supporting autonomous driving after it arrives at the coordinates of the exit of the waiting area.

Here, at step S261, the server device 10 for supporting autonomous driving checks the resource request queue, thereby checking whether the shared resource is occupied.

Also, when it is determined at step S262 that the shared resource is occupied, the server device 10 for supporting autonomous driving may instruct the autonomous driving robot apparatus 100, which made a request for the use of the shared resource, to wait in the waiting area at step S263.

Here, when it is determined at step S262 that the shared resource is not occupied, the server device 10 for supporting autonomous driving may give approval for the use of the shared resource to the autonomous driving robot apparatus 100, which made a request for the use of the shared resource, at step S264.

Here, at step S264, an autonomous driving robot apparatus 100 to which a high-priority delivery task is assigned may be preferentially approved to use the shared resource.

Here, at step S264, whether at least two autonomous driving robot apparatuses 100 are capable of simultaneously using the shared resource may be checked using the specifications thereof, for example, the size, the weight, and the like.

Here, at step S264, when it is determined that at least two autonomous driving robot apparatuses 100 are capable of simultaneously using the shared resource, the at least two autonomous driving robot apparatuses 100 may be preferentially approved to use the shared resource.

Here at step S264, a list of the autonomous driving robot apparatuses 100 instructed to wait in the waiting area may be put in the waiting area queue, and information about whether there is available space in the waiting area may be updated.

Here, at step S264, the autonomous driving robot apparatus 100 receives a control command for using the shared resource from the server device 10 for supporting autonomous driving, whereby the server device 10 for supporting autonomous driving may control the use of the shared resource by the autonomous driving robot apparatus 100.

Also, at step S264, after it finishes using the shared resource, the autonomous driving robot apparatus 100 may determine whether the current position is the final destination. When it is determined that the current position is not the final destination, the autonomous driving robot apparatus 100 may create a route to the next destination and perform autonomous driving along the created route at step S231.

That is, in the autonomous driving method according to an embodiment of the present invention, the above-described procedure may be repeatedly performed until the autonomous driving robot apparatus 100 arrives at the final destination.

Figure 9:
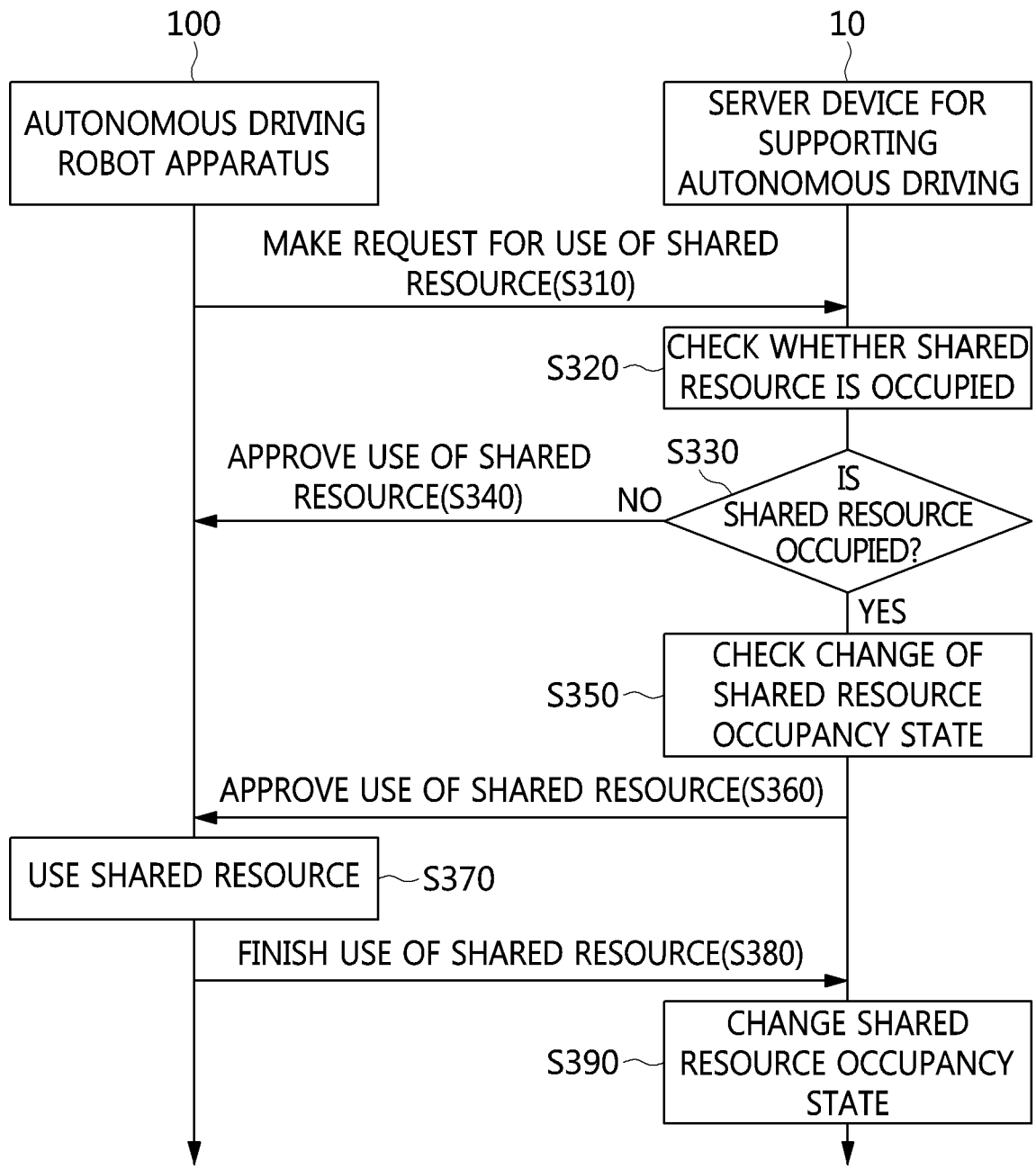
FIG. 9 is a sequence diagram that shows the process of using a shared resource according to an embodiment of the present invention.

FIG. 9 is a sequence diagram that shows the process of using a shared resource according to an embodiment of the present invention.

Referring to FIG. 9, the process of using a shared resource according to an embodiment of the present invention is specifically illustrated using a sequence diagram.

In the process of using a shared resource according to an embodiment of the present invention, first, the autonomous driving robot apparatus 100 may make a request to the server device 10 for supporting autonomous driving for the use of a shared resource at step S310.

Here, in the process of using a shared resource according to an embodiment of the present invention, the server device 10 for supporting autonomous driving may check whether the shared resource is occupied at step S320.

Here, at step S320, the server device 10 for supporting autonomous driving may put information about the autonomous driving robot apparatus 100, which made a request for the use of the shared resource, in a resource request queue.

Here, at step S320, the server device 10 for supporting autonomous driving may send a wait command to the autonomous driving robot apparatus 100.

Also, in the process of using a shared resource according to an embodiment of the present invention, the server device 10 for supporting autonomous driving checks whether the shared resource is occupied at step S330 and approves the use of the shared resource at step S340 when the shared resource is determined not to be occupied. When the shared resource is determined to be occupied, the change of the occupancy state may be checked at step S350.

That is, at step S350, when the occupancy state is changed because the autonomous driving robot apparatus 100 that occupied the shared resource has finished using the shared resource, the server device 10 for supporting autonomous driving gives approval for the use of the shared resource to an autonomous driving robot apparatus 100 waiting in the waiting area at step S360 based on the information in the resource request queue.

Also, in the process of using a shared resource according to an embodiment of the present invention, the autonomous driving robot apparatus 100 is approved to use the shared resource by the server device 10 for supporting autonomous driving. Accordingly, the autonomous driving robot apparatus 100 may use the shared resource at step S370.

That is, at step S370, the autonomous driving robot apparatus 100 may be approved to use the shared resource by the server device 10 for supporting autonomous driving.

Here, at step S370, the autonomous driving robot apparatus 100 receives a control command for using the shared resource from the server device 10 for supporting autonomous driving, thereby using the shared resource depending on the control command from the server device 10 for supporting autonomous driving.

Also, in the process of using a shared resource according to an embodiment of the present invention, when it finishes using the shared resource, the autonomous driving robot apparatus 100 may send a shared resource use completion message to the server device 10 for supporting autonomous driving.

Also, in the process of using a shared resource according to an embodiment of the present invention, the server device 10 for supporting autonomous driving may update the occupancy state of the shared resource at step S390 by receiving the shared resource use completion message.

That is, at step S390, the server device 10 for supporting autonomous driving receives the shared resource use completion message from the autonomous driving robot apparatus 100, deletes information about the corresponding autonomous driving robot apparatus 100 from the resource request queue, and gives approval for the use of the shared resource to the next autonomous driving robot apparatus 100.

Figure 10:
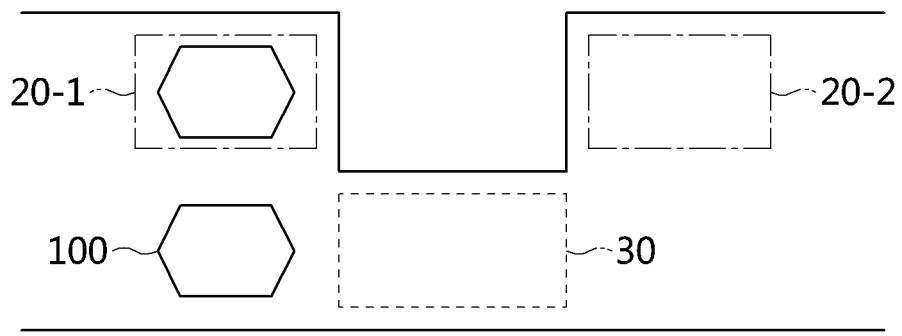
FIG. 10 is a view that shows an autonomous driving method in a narrow passage corresponding to a shared resource according to an embodiment of the present invention.

FIG. 10 is a view that shows an autonomous driving method in a narrow passage, which is a shared resource, according to an embodiment of the present invention.

Referring to FIG. 10, the autonomous driving method in a narrow passage, which is a shared resource, according to an embodiment of the present invention is illustrated.

The autonomous driving robot apparatus 100 moves along a route to a destination, thereby arriving at a waiting area 20-1 in order to use a shared resource 30.

Here, the autonomous driving robot apparatus 100 may make a request to the server device 10 for supporting autonomous driving for the use of the shared resource.

Here, when it is determined that the shared resource 30 is not occupied, the server device 10 for supporting autonomous driving gives approval for the use of the shared resource 30 to the autonomous driving robot apparatus 100 and changes the occupancy state of the shared resource to an occupied state.

Here, after it passes through the narrow passage corresponding to the shared resource 30, the autonomous driving robot apparatus 100 may send a shared resource use completion message to the server device 10 for supporting autonomous driving.

Here, the server device 10 for supporting autonomous driving may receive the shared resource use completion message and change the occupancy state of the shared resource to an available state.

Also, in the case in which the shared resource is a narrow passage, autonomous driving robot apparatuses 100 at opposite ends of the narrow passage may make requests to the server device 10 for supporting autonomous driving for the use of the shared resource.

Here, the server device 10 for supporting autonomous driving may give approval for the use of the shared resource to the autonomous driving robot apparatus 100 that made the request earlier than the other one, and may then give approval for the use of the shared resource to the other autonomous driving robot apparatus 100 after it receives a shared resource use completion message.

Here, when a delivery task assigned to the autonomous driving robot apparatus 100 that made the request later than the other autonomous driving robot apparatus 100 has a higher priority, the server device 10 for supporting autonomous driving may preferentially give approval for the use of the shared resource to the autonomous driving robot apparatus 100 to which the high-priority delivery task is assigned.

Also, when it is determined that the autonomous driving robot apparatuses 100 at both ends are capable of passing through the narrow passage at the same time, based on the specifications thereof, the server device 10 for supporting autonomous driving may simultaneously give approval for the use of the shared resource to the autonomous driving robot apparatuses 100 at both ends.

Figure 11:
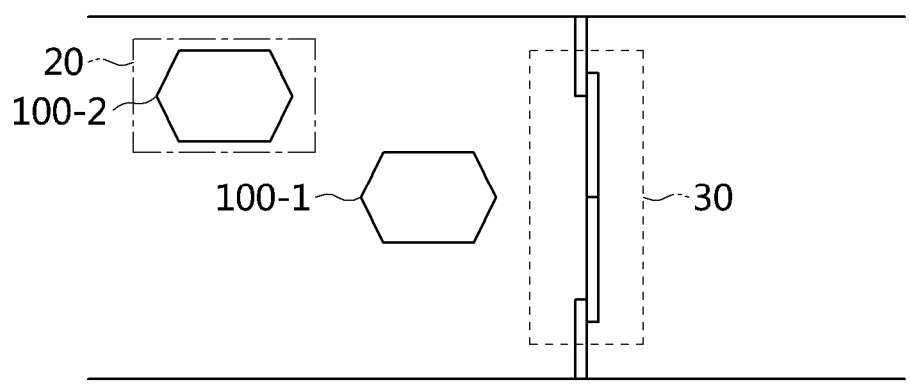
FIG. 11 is a view that shows an autonomous driving method at an automatic door corresponding to a shared resource according to an embodiment of the present invention.

FIG. 11 is a view that shows a method of driving autonomously in front of an automatic door, which is a shared resource, according to an embodiment of the present invention.

Referring to 11, the method of driving autonomously in front of an automatic door, which is a shared resource, according to an embodiment of the present invention is illustrated.

Here, it is confirmed that a first autonomous driving robot apparatus 100-1 occupies the shared resource 300, which is the automatic door, and that a second autonomous driving robot apparatus 100-2 waits in a waiting area 20.

Here, after the first autonomous driving robot apparatus 100-1 finishes using the shared resource, when the server device 10 for supporting autonomous driving receives a shared resource use completion message therefrom, the server device 10 for supporting autonomous driving may give approval for the use of the shared resource to the second autonomous driving robot apparatus 100-2, which is waiting in the waiting area 20.

Also, in the case in which a shared resource is an automatic door, autonomous driving robot apparatuses 100 facing each other across the automatic door may make requests to the server device 10 for supporting autonomous driving for the use of the shared resource.

Here, the server device 10 for supporting autonomous driving may first give approval for the use of the shared resource to the autonomous driving robot apparatus 100 that made the request earlier than the other one, and may then give approval for the use of the shared resource to the other autonomous driving robot apparatus 100 after it receives a shared resource use completion message.

Here, when a delivery task assigned to the autonomous driving robot apparatus 100 that made the request later than the other autonomous driving robot apparatus 100 has a higher priority, the server device 10 for supporting autonomous driving may preferentially give approval for the use of the shared resource to the autonomous driving robot apparatus 100 to which the high-priority delivery task is assigned.

Also, when it is determined that the autonomous driving robot apparatuses 100 facing each other across the automatic door are capable of passing through the automatic door at the same time, based on the specifications thereof, the server device 10 for supporting autonomous driving may simultaneously give approval for the use of the shared resource to the autonomous driving robot apparatuses 100 facing each other across the automatic door.

Figure 12:
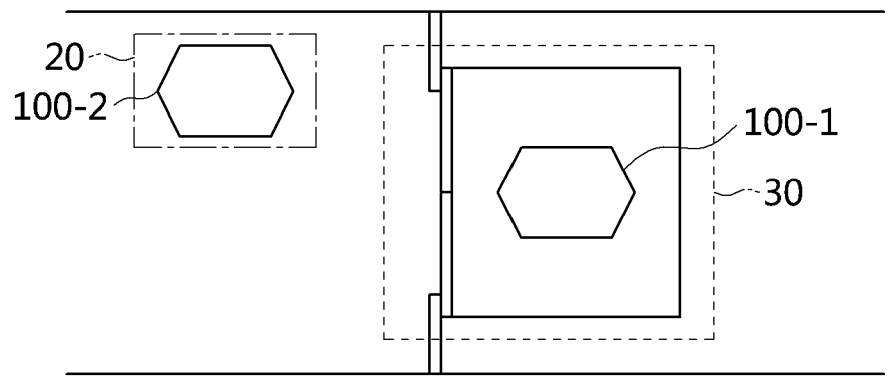
FIG. 12 is a view that shows an autonomous driving method in an elevator corresponding to a shared resource according to an embodiment of the present invention.

FIG. 12 is a view that shows an autonomous driving method in an elevator, which is a shared resource, according to an embodiment of the present invention.

Referring to FIG. 12, the autonomous driving method in an elevator, which is a shared resource, according to an embodiment of the present invention is illustrated.

Here, it is confirmed that a first autonomous driving robot apparatus 100-1 occupies the shared resource 30, which is an elevator, and that a second autonomous driving apparatus 100-2 is waiting in a waiting area 20.

Here, after the first autonomous driving robot apparatus 100-1 finishes using the shared resource, when the server device 10 for supporting autonomous driving receives a shared resource use completion message therefrom, the server device 10 for supporting autonomous driving may give approval for the use of the shared resource to the second autonomous driving robot apparatus 100-2, which is waiting in the waiting area 20.

Also, another autonomous driving robot apparatus 100 on another floor may make a request to the server device 10 for supporting autonomous driving for the use of the shared resource.

Here, the server device 10 for supporting autonomous driving may first give approval for the use of the shared resource to the autonomous driving robot apparatus 100 that made the request earlier than the other one, and may then give approval for the use of the shared resource to the other autonomous driving robot apparatus 100 after it receives a shared resource use completion message.

Here, when a delivery task assigned to the autonomous driving robot apparatus 100 that made the request later than the other autonomous driving robot apparatus 100 has a higher priority, the server device 10 for supporting autonomous driving may preferentially give approval for the use of the shared resource to the autonomous driving robot apparatus 100 to which the high-priority delivery task is assigned.

Also, when it is determined that it is possible for at least two autonomous driving robot apparatuses 100 on the same floor to ride the elevator at the same time, based on the specifications thereof, the server device 10 for supporting autonomous driving may simultaneously give approval for the use of the shared resource to the at least two autonomous driving robot apparatuses 100.

Figure 13:
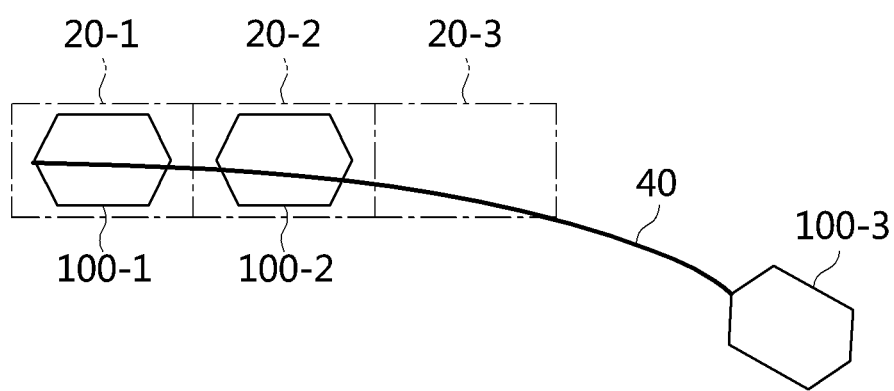
FIG. 13 and FIG. 14 are views that show the process in which an autonomous driving robot apparatus according to an embodiment of the present invention waits in a waiting area.
Figure 14:
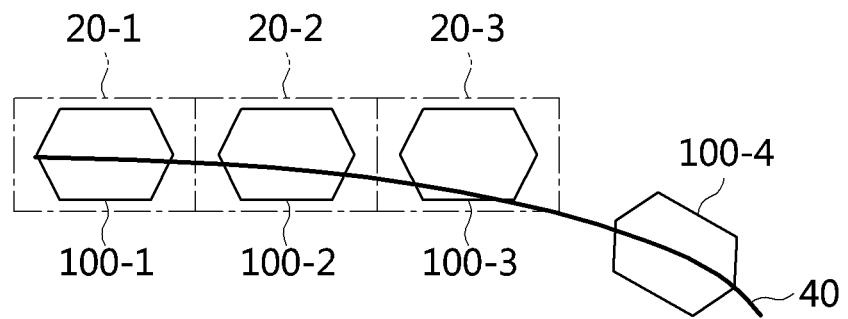

FIG. 13 and FIG. 14 are views that show a procedure in which an autonomous driving robot apparatus according to an embodiment of the present invention waits in a waiting area.

Referring to FIG. 13, it is confirmed that autonomous driving robot apparatuses 100 perform autonomous driving along a route 40 and enter a waiting area.

Here, the waiting area may have waiting spaces, each of which is set in consideration of the size of an autonomous driving robot apparatus 100, and the autonomous driving robot apparatuses 100 may wait in the respective waiting spaces.

That is, a first autonomous driving robot apparatus 100-1 that first arrived at the waiting area may wait in the wait space 20-1, and a second autonomous driving robot apparatus 100-2 that arrived immediately after the first autonomous driving robot apparatus 100-1 may wait in the wait space 20-2.

Also, a third autonomous driving robot apparatus 100-3 that is entering the waiting area may check whether there is available space in the waiting area using sensor data or by requesting information thereabout from the server device 10 for supporting autonomous driving.

Here, the third autonomous driving robot apparatus 100-3 may detect that a waiting space 20-3 is vacant, and may wait for the use of a shared resource in the waiting space 20-3.

Referring to FIG. 14, it is confirmed that the third autonomous driving robot apparatus 100-3 is waiting in the waiting space 20-3 and that a fourth autonomous driving robot apparatus 100-4 arrives at the entrance to the waiting area by moving along the route 40.

Here, the fourth autonomous driving robot apparatus 100-4 may check whether there is available space in the waiting area using sensor data or by requesting information thereabout from the server device 10 for supporting autonomous driving. When it is determined that there is no available space in the waiting area, the fourth autonomous driving robot apparatus 100-4 may move to a wandering place, which is previously designated.

Figure 15:
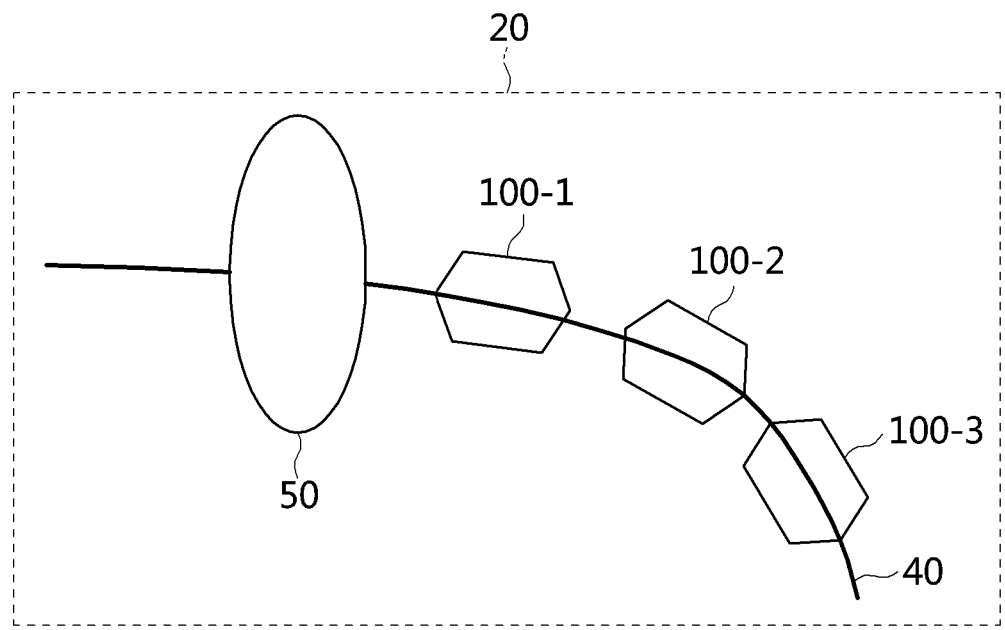
FIG. 15 is a view that shows an example in which an autonomous driving robot apparatus according to an embodiment of the present invention waits in front of an obstacle.

FIG. 15 is a view that shows an example in which an autonomous driving robot apparatus is waiting in front of an obstacle according to an embodiment of the present invention.

Referring to 15, it is confirmed that autonomous driving robot apparatuses 100-1, 100-2 and 100-3 are waiting for the use of the shared resource together with a moving obstacle 50, such as a person, or the like, inside a waiting area 20.

Here, when the obstacle 50 deviates from the route, the first autonomous driving robot apparatus 100-1 may perform autonomous driving towards the coordinates of the exit of the waiting area.

When the obstacle 50 is located at the coordinates of the entrance to the waiting area, an autonomous driving robot apparatus 100, arriving at the entrance to the waiting area, may move to a wandering area.

Figure 16:
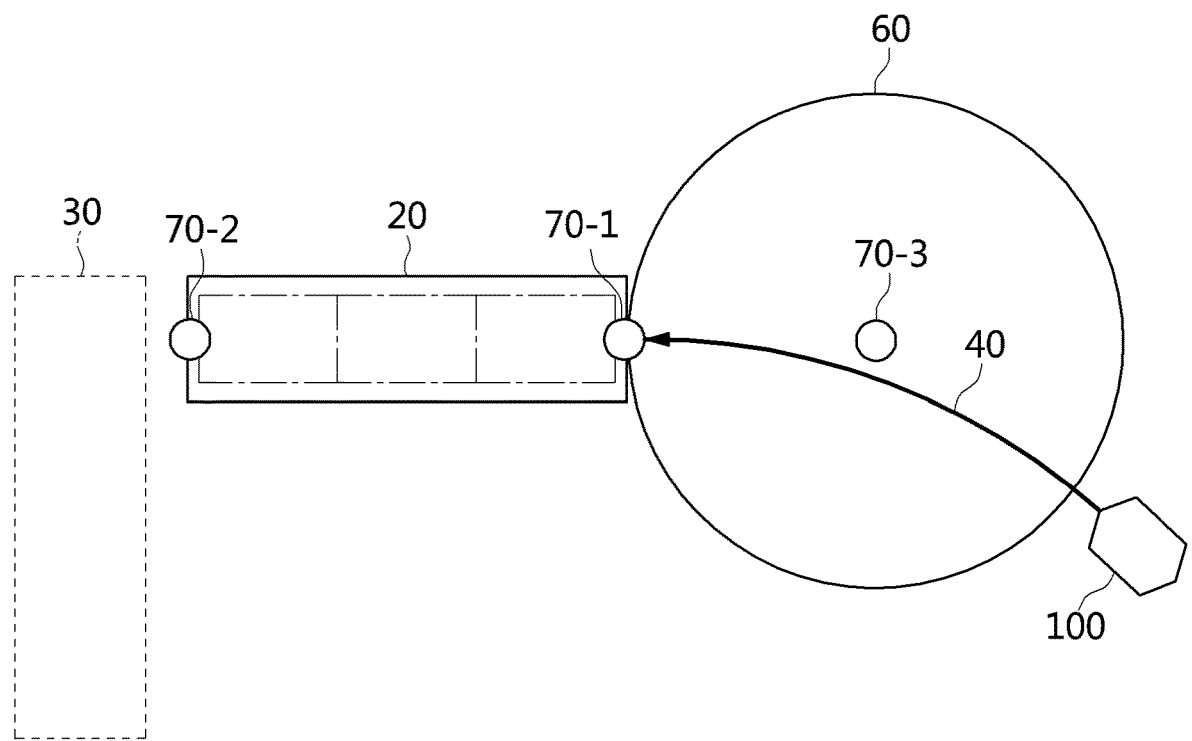
FIG. 16 is a view that shows an example in which an autonomous driving robot apparatus according to an embodiment of the present invention moves to a waiting area via a wandering area.
Figure 17:
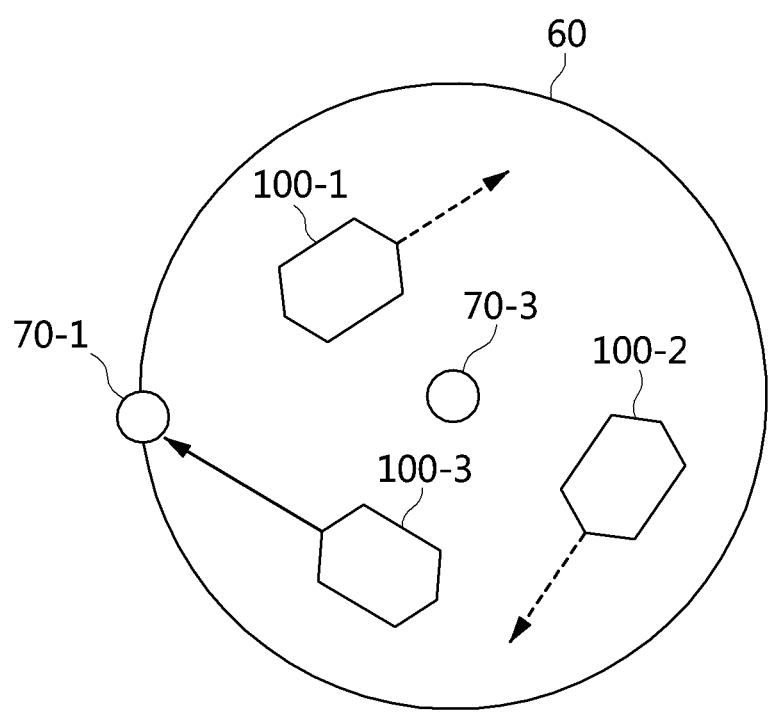
FIG. 17 is a view that shows an example in which an autonomous driving robot apparatus according to an embodiment of the present invention wanders in a wandering area.

FIG. 16 is a view that shows an example in which an autonomous driving robot apparatus moves to a waiting area from a wandering area according to an embodiment of the present invention. FIG. 17 is a view that shows an example in which an autonomous driving robot apparatus is wandering in a wandering area according to an embodiment of the present invention.

Referring to FIG. 16, on a route 40 to a destination, a waiting area 20, a shared resource 30, a wandering area 60, an entrance 70-1 to the waiting area, an exit 70-2 from the waiting area, and the center point 70-3 of the wandering area are illustrated.

Here, the autonomous driving robot apparatus 100 may perform autonomous driving to the entrance 70-1 of the waiting area along the route 40.

Here, at the entrance 70-1 to the waiting area, the autonomous driving robot apparatus 100 may check whether there is available space in the waiting area using sensor data or by requesting information thereabout from the server device 10 for supporting autonomous driving, and may wait in the waiting area when it is determined that there is available space in the waiting area.

Here, when it is determined that there is no available space in the waiting area, the autonomous driving robot apparatus 100 may move to the center point 70-3 of the wandering area and wander within the wandering area 60, which is a circular area having a preset radius from the center point 70-3, until a sufficient amount of space is available in the waiting area.

Referring to FIG. 17, autonomous driving robot apparatuses 100-1, 100-2 and 100-3 are wandering in the wandering area.

Here, the autonomous driving robot apparatus 100 moves to the entrance 70-1 of the waiting area at preset intervals and checks whether there is available space in the waiting area by requesting information thereabout from the server device 10 for supporting autonomous driving.

Also, as the delivery task assigned to an autonomous driving robot apparatus 100 has a higher priority, the autonomous driving robot apparatus 100 more frequently moves to the entrance 70-1 of the waiting area and checks whether there is available space in the waiting area by requesting information thereabout from the server device 10 for supporting autonomous driving.

Figure 18:
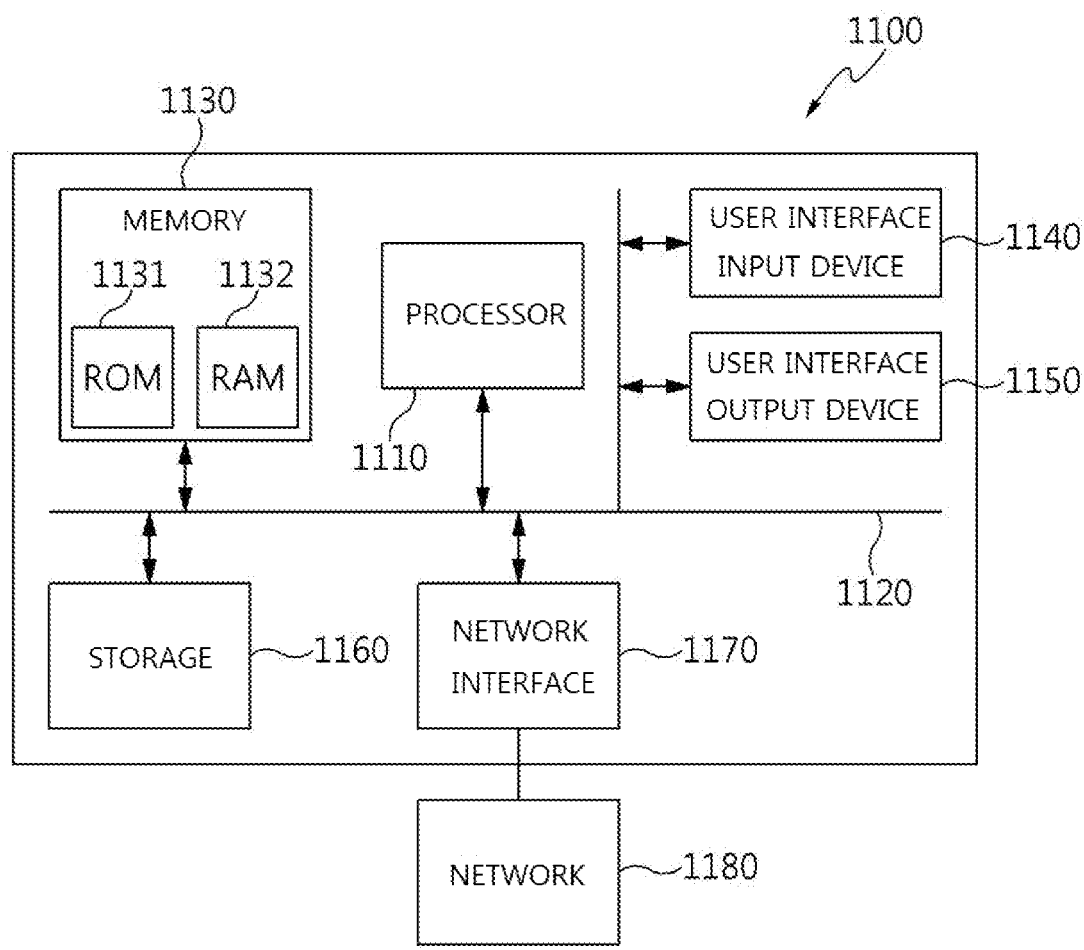
FIG. 18 is a block diagram that shows a computer system according to an embodiment of the present invention.

FIG. 18 is a block diagram that shows a computer system according to an embodiment of the present invention.

Referring to FIG. 18, the autonomous driving robot apparatus 100 and the server device 10 for supporting autonomous driving according to an embodiment of the present invention may be implemented in a computer system 1100 including a computer-readable recording medium. As illustrated in FIG. 18, the computer system 1100 may include one or more processors 1110, memory 1130, a user interface input device 1140, a user interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

The present invention may resolve a deadlock caused in a small space in which it is difficult for multiple autonomous driving robots to simultaneously drive in opposite directions.

Also, the present invention may prevent an autonomous driving robot from coming to a deadlock that is caused in a shared resource, the use of which is simultaneously requested by multiple autonomous driving robots.

Also, the present invention may improve the delivery efficiency of autonomous driving robots and reduce the expense of driving the autonomous driving robots.

As described above, an autonomous driving robot apparatus and an autonomous driving method according to the present invention are not limitedly applied to the configurations and operations of the above-described embodiments, but all or some of the embodiments may be selectively combined and configured, so that the embodiments may be modified in various ways.

What is claimed is:

1. An autonomous driving method of an autonomous driving robot apparatus, comprising:
    receiving task information for autonomous driving from a server device for supporting autonomous driving;
    creating a route for autonomous driving based on the task information and performing autonomous driving; and
    selecting an autonomous driving operation corresponding to any one of moving, waiting, and wandering when arriving at a preset destination by performing autonomous driving along the route;
    wherein the autonomous driving robot apparatus moves to an exit of a waiting area when it is determined that there is available space in the waiting area.

2. The autonomous driving method of claim 1, wherein selecting the autonomous driving operation is configured such that the autonomous driving robot apparatus determines at least one of a kind and a state of the destination and selects the autonomous driving operation depending on the determination.

3. The autonomous driving method of claim 2, wherein selecting the autonomous driving operation is configured such that the autonomous driving robot apparatus checks whether there is available space in the waiting area when the kind of the destination is determined to be an entrance to the waiting area.

4. The autonomous driving method of claim 3, wherein selecting the autonomous driving operation is configured such that, when an obstacle is sensed en route to the exit of the waiting area, the autonomous driving robot apparatus waits at a current position while maintaining a preset distance from the obstacle.

5. The autonomous driving method of claim 4, wherein selecting the autonomous driving operation is configured such that the autonomous driving robot apparatus moves in order to maintain the preset distance when the obstacle moves away from the autonomous driving robot apparatus.

6. The autonomous driving method of claim 5, wherein selecting the autonomous driving operation is configured such that the server device for supporting autonomous driving checks whether a shared resource is occupied when the autonomous driving robot apparatus arrives at the exit of the waiting area.

7. The autonomous driving method of claim 6, wherein selecting the autonomous driving operation is configured such that the server device for supporting autonomous driving sequentially puts information about an autonomous driving robot apparatus that made a request for use of the shared resource in a resource request queue and manages the resource request queue.

8. The autonomous driving method of claim 7, wherein selecting the autonomous driving operation is configured such that the server device for supporting autonomous driving sequentially approves the requests of the autonomous driving robot apparatuses for the use of the shared resource in an order in which pieces of information of the autonomous driving robot apparatuses are put in the resource request queue when the server device for supporting autonomous driving receives a message for announcing completion of the use of the shared resource.

9. The autonomous driving method of claim 8, wherein selecting the autonomous driving operation is configured such that the server device for supporting autonomous driving compares priorities of delivery tasks assigned to the autonomous driving robot apparatuses, the information of which is put in the resource request queue, and sequentially approves the requests of the autonomous driving robot apparatuses for the use of the shared resource depending on the priorities.

10. The autonomous driving method of claim 9, wherein selecting the autonomous driving operation is configured such that the server device for supporting autonomous driving checks specifications of the autonomous driving robot apparatuses, information of which is put in the resource request queue, determines whether the shared resource is capable of being simultaneously used by at least two autonomous driving robot apparatuses, and approves the requests of the at least two autonomous driving robot apparatuses for the use the shared resource.

11. The autonomous driving method of claim 3, wherein selecting the autonomous driving operation is configured such that the autonomous driving robot apparatus moves to a preset wandering area and wanders in the wandering area when it is determined that there is no available space in the waiting area.

12. The autonomous driving method of claim 11, wherein selecting the autonomous driving operation is configured such that the autonomous driving robot apparatus wanders in the wandering area and moves to the entrance of the waiting area at preset intervals, thereby checking whether there is available space in the waiting area.

13. The autonomous driving method of claim 12, wherein selecting the autonomous driving operation is configured such that the autonomous driving robot apparatus checks a priority of a delivery task and moves to the entrance of the waiting area at intervals that are set so as to correspond to the priority, thereby checking whether there is available space in the waiting area.

14. An autonomous driving robot apparatus, comprising:
    a computing system comprising a memory and a processor for executing processing instructions stored in the memory to provide:

a robot network communication unit for receiving task information from a server device for supporting autonomous driving;

a robot state management unit for creating a route for autonomous driving based on the task information;

a driving unit for performing autonomous driving along the route; and a driving condition determination unit for selecting an autonomous driving operation corresponding to any one of moving, waiting, and wandering when arriving at a preset destination by performing autonomous driving along the route and for controlling the driving unit depending on the autonomous driving operation, wherein the driving condition determination unit moves the autonomous driving robot apparatus to an exit of a waiting area when it is determined that there is available space in the waiting area.

15. The autonomous driving robot apparatus of claim 14, wherein the driving condition determination unit selects the autonomous driving operation by determining at least one of a kind and a state of the destination at which the autonomous driving robot apparatus arrives.

16. The autonomous driving robot apparatus of claim 15, wherein the driving condition determination unit checks whether there is available space in the waiting area when the kind of the destination is determined to be an entrance to the waiting area, and selects an autonomous driving operation corresponding to any one of moving and wandering depending on whether there is available space in the waiting area.

17. The autonomous driving robot apparatus of claim 16, wherein, when an obstacle is sensed en route to an exit of the waiting area, the driving condition determination unit makes the autonomous driving robot apparatus wait at a current position while maintaining a preset distance between the autonomous driving robot apparatus and the obstacle.

18. The autonomous driving robot apparatus of claim 17, wherein, when it is determined that the autonomous driving robot apparatus arrives at the exit of the waiting area, the server device for supporting autonomous driving checks whether a shared resource is occupied, sequentially puts information about an autonomous driving robot apparatus that made a request for use of the shared resource in a resource request queue, and manages the resource request queue.

19. The autonomous driving robot apparatus of claim 18, wherein, when it is determined that there is no available space in the waiting area, the driving condition determination unit moves the autonomous driving robot apparatus to a preset wandering area, makes the autonomous driving robot apparatus wander therein, and moves the autonomous driving robot apparatus to the entrance of the waiting area at preset intervals, thereby checking whether there is available space in the waiting area.

* * * * *